United States Patent
Lattard et al.

(10) Patent No.: US 6,335,947 B1
(45) Date of Patent: Jan. 1, 2002

(54) PROCESS FOR THE PROCESSING OF AN INFORMATION TRANSMISSION SIGNAL BY SPREAD SPECTRUM AND THE CORRESPONDING RECEIVER

(75) Inventors: Didier Lattard, Rencurel; Christophe Boulanger, Ivry sur Seine; Didier Varreau, St George de Commiers; Mathieu Bouvier Des Noes, Grenoble, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/166,543

(22) Filed: Oct. 5, 1998

(30) Foreign Application Priority Data

Oct. 22, 1997 (FR) .............................. 97 13237

(51) Int. Cl.⁷ ..................... H04B 15/00; H04K 1/00; H04L 27/30
(52) U.S. Cl. ........................ 375/142; 375/343
(58) Field of Search ............................. 375/130, 136, 375/140, 142, 144, 147, 150, 343; 370/335, 342, 441, 442

(56) References Cited

U.S. PATENT DOCUMENTS 5,379,320 A * 1/1995 Fernandes et al. ............. 375/1
5,956,333 A * 9/1999 Zhou et al. ................. 370/342

FOREIGN PATENT DOCUMENTS

| EP | 0 491 668 | 6/1992 |
| EP | 0 701 343 | 3/1996 |
| EP | 0 711 044 | 5/1996 |

* cited by examiner

Primary Examiner—Mohammad H. Ghayour
(74) Attorney, Agent, or Firm—Oblon, Spivak, McClelland, Maier & Neustadt, P.C.

(57) ABSTRACT

A method for processing a direct sequence spread spectrum signal, and a receiver for performing the method. A correlation is preformed between a received signal and the direct sequence used to determine peaks of different amplitudes. The spectrum of the information corresponding to the highest amplitude peak is respread using the direct sequence. The respread signal is subtracted from the received signal to create a new signal. This process is reiterated on the new signal until all of the peaks have been exhausted.

6 Claims, 4 Drawing Sheets

(nb CHIPS)

(nb CHIPS)

PROCESS FOR THE PROCESSING OF AN INFORMATION TRANSMISSION SIGNAL BY SPREAD SPECTRUM AND THE CORRESPONDING RECEIVER

TECHNICAL FIELD

The present invention relates to a process for processing an information transmission signal by spread spectrum and a corresponding receiver.

PRIOR ART

The direct sequence spread spectrum modulation technique has been used for many years, particularly in radio communications with satellites and in the military sector.

In a digital data emitter using a conventional modulation technique, the data to be emitted modulate a radio-frequency carrier. The modulation used can be a phase, frequency, amplitude or mixed modulation. In order to simplify the description, reference will only be made to phase modulations, which are now the most frequently used.

The digital data to be transmitted consist of binary elements or bits, which have a period $T_b$, i.e. a new bit must be transmitted every $T_b$. With said bits it is possible to form bit groups, also known as symbols, whose period is $T_s$ and is a multiple of $T_b$. These symbols will modulate the radio-frequency carrier, e.g. in phase.

This technique can be illustrated by two phase modulation examples:

a) The modulation known as binary phase shift keying or BPSK, which consists of allocating a phase state, e.g. 0, to the 0 bits, and a phase state $\pi$ to the 1 bits. In this case the symbol is the actual bit ($T_s=T_b$) and the radio-frequency carrier phase state is imposed on every bit.

b) Modulation known as quaternary phase shift keying or QPSK, which consists of using symbols formed by two successive bits, so that said symbols can assume four states (00, 01, 10, 11). A state of the phase of the carrier is allocated to each of these states, in this case $T_s=2T_b$ and the radio-frequency carrier phase state is imposed on every other bit.

On the reception side, it is necessary to demodulate the signal received. A distinction can be made between two major demodulation families, namely coherent demodulation and non-coherent demodulation. The coherent demodulation technique consists of implementing, in the receiver, a subassembly, whose function is to estimate the mean phase of the carrier, so as to reconstitute a phase reference, which is then mixed with the signal received in order to demodulate the data.

The non-coherent demodulation technique is based on the observation, according to which it is sufficient for the phase reference of the symbol to be compared with the phase of the preceding symbol. In this case, instead of estimating the phase of the symbols, the receiver estimates the phase difference between two successive symbols. This is a differential phase shift keying or DPSK or a differential quadrature phase shift keying or DQPSK.

The attached FIGS. 1 to 3 diagrammatically show the structure and operation of a spread spectrum emitter and receiver operating in DPSK. This corresponds to FR-A-2 712 129.

FIG. 1 shows the block diagram of an emitter. Said emitter has an input $E_e$, which receives the data $b_k$ to be emitted and comprises a differential coder 10, constituted by a logic circuit 12 and a delay circuit 14. The emitter also comprises a pseudorandom sequence generator 30, a multiplier 32, a local oscillator 16 and a modulator 18 connected to an output Se, which supplies the DPSK signal.

The logic circuit 12 receives the binary data $b_k$ and delivers the binary data $d_k$. The logic circuit 12 also receives the data delayed by one order or rank, i.e. $d_{k-1}$. The logic operation performed in the circuit 12 is the exclusive-OR on the data $b_k$ and on the delayed compliment of $d_k$ (i.e. on $\overline{d_{k-1}}$):

$$d_k = b_k + e,\text{crc} + + ee \, \overline{d_{k-1}}$$

The pseudorandom sequence used on emission for modulating the data must have an autocorrelation function with a marked peak (of value N) for a zero delay and the smallest possible secondary lobes. This can be obtained by using maximum length sequences, also called m-sequences, or so-called GOLD or KASAMI sequences in exemplified manner. This pseudorandom sequence designated $\{C_i\}$, has a bit rate N times higher than the rate of the binary data to be transmitted. The duration $T_c$ of a bit of said pseudorandom sequence and which is also known as a chip is consequently equal to $T_b/N$.

The chip rate of the pseudorandom sequence can be several million, or several tens of millions per second.

The attached FIG. 2 is the block diagram of a corresponding receiver of the differential demodulator type. This receiver has an input Er and comprises a matched filter 20, whose pulse response is the time reverse of the pseudorandom sequence used in the emitter, a delay circuit 22 with a duration $T_b$, a multiplier 24, an integrator 26 on a period $T_b$ and a logic decision circuit 28. The receiver has an output Sr, which restores the data.

If x(t) is used for designating the signal applied to the input Er, the multiplier 24 receives the filtered signal $x_F(t)$ and the delayed-filtered signal $x_F(t-T_b)$. The product is integrated on a period equal to or smaller than $T_b$ in the integrator 26, which supplies a signal, whose polarity makes it possible to determine the value of the transmitted bit.

The input filter 20 used in the receiver has a base band equivalent pulse response H(t) and said response must be the time-reverse, conjugate complex of the pseudorandom sequence c(t) used on emission:

$$H(t)=c^*(T_b-t)$$

The signal supplied by such a filter is consequently:

$$x_F(t)=x(t)*H_F(t)$$

where the symbol * designates the convolution operation, i.e.

$$x_F(t)=\int_0^{T_b} x(s).c^*(s-t)ds.$$

Thus, the matched filter 20 performs the correlation between the signal applied at its input and the pseudorandom spread sequence.

In a gaussian additive noise channel, the signal x(Ft) will consequently be in the form of a pulse signal, the pulse repetition frequency being $1/T_b$. The envelope of this signal is the autocorrelation function of the signal c(t). The information is carried by the phase difference between two successive correlation peaks. Thus, the multiplier output is formed by a succession of positive or negative peaks, as a function of the value of the transmitted bit.

In the case of a radio transmission in the presence of multiple paths, the output of the matched filter is formed by a succession of correlation peaks, each peak corresponding to a propagation path.

The different signals of the reception chain are represented in FIG. 3.

Line (a) represents the filtered signal $x_F(t)$, line (b) the correlation signal $x_F(t)*x_F(t-T_b)$ and line (c) the signal at the integrator output.

The direct sequence spread spectrum modulation technique has been extensively described in the specialist literature and reference can e.g. be made to the following works:

"CDMA Principles of Spread Spectrum Communication", by Andrew J. VITERBI, Addison-Wesley Wireless Communications Series, "Spread Spectrum Communications", by Marvin K. SIMON et al., vol. I, 1983, Computer Science Press, "Spread Spectrum Systems", by R. C. DIXON, John WILEY and Sons.

This technique is also described in certain articles:

"Direct-sequence Spread Spectrum with DPSK Modulation and Diversity for Indoor Wireless Communications", published by Mohsen KAVEHRAD and Bhaskar RAMAMURTHI in the journal "IEEE Transactions on Communications", vol. COM 35, No. 2, February 1987, "Practical Surface Acoustic Wave Devices", by Melvin G. HOLLAND, in the journal Proceedings of the IEEE, vol. 62, No. 5, May 1974, pp 582–611.

The direct sequence spread spectrum technique has numerous advantages, such as:

Discretion: this discretion is linked with the spread of the transmitted information over a wide frequency band, leading to a low spectral density of the emitted power.

Multiple access: several direct sequence spread spectrum links can share the same frequency band using orthogonal spread pseudorandom sequences (sequences having an intercorrelation function having very low residual noise for all shifts), said technique being known as code distribution multiple access or CDMA.

A good cohabitation with conventional narrow band communications: the same frequency band being shared by systems using a narrow band modulation and those using a broad band modulation. There is only a slight increase in ambient radio noise to narrow band communications and this decreases with the increase in the sequence length. Spread spectrum modulation communications bring about a rejection of narrow band modulations due to the correlation operation performed on reception.

The interception difficulty: a direct sequence spread spectrum transmission is difficult to intercept as a result of the low spectral density and the fact that the receiver must know the spread sequence in order to be able to demodulate the data.

An excellent behaviour in a multi-path environment, where the propagation of the radio wave takes place in accordance with multiple paths using reflection, diffraction and scattering phenomena. Moreover, not infrequently there is no longer a time-stable, direct path between the emitter and the receiver. This multiple path propagation induces parasitic effects, which tend to deteriorate the transmission quality.

The technique described hereinbefore suffers from a disadvantage linked with the need to perform an estimate of the channel, i.e. a determination of the number of paths followed by the radio wave, with the corresponding delays and amplitudes, this applying to each user. This estimate is often difficult, particularly when the channel has multiple paths, there are several users and a certain radio noise level interferes with the signals.

Moreover, in an integration receiver of the type described hereinbefore, the energy carried by the multiple paths is summated by means of an accumulator, which functions on a part of the symbol. In order that such receivers function in a satisfactory manner, it is necessary for the pulse response of the channel (part where the peaks appear) is shorter than the duration of a symbol (generally twice shorter). If this rule is not respected, it becomes difficult to separate the symbols, and when the pulse response is greater than the symbol, an intersymbol distortion phenomenon prevents a correct data demodulation. The accumulation principle no longer gives a good performance level.

The object of the present invention is to obviate these disadvantages.

DESCRIPTION OF THE INVENTION

To this end, the invention proposes a process no longer operating in accordance with the signal integration principle, but which instead processes successively the correlation peaks in decreasing amplitude order. For this purpose, the process according to the invention consists of determining the highest amplitude correlation peak, subtracting the information corresponding to this peak from the signal to be processed and again processing the signal in the same way and so on until the peaks are exhausted. On the basis of the successive informations obtained by the different passes of this iteration, the transmitted information is restored.

In other words, instead of considering the different correlation peaks in a global manner by integrating them, they are successively, individually analyzed.

More specifically, the present invention relates to a process for the processing of a signal corresponding to a direct sequence spread spectrum information transmission through a multiple path channel, said process being characterized in that it comprises the following operations:

a) a correlation is performed between the signal to be processed and the direct sequence used, which supplies several correlation peaks of different amplitudes, b) the highest amplitude correlation peak is determined and the corresponding information restored, c) the spectrum of the information corresponding to the highest amplitude peak is respread using the same direct sequence, d) from the signal to be processed is subtracted the part corresponding to said respread information and a new signal is obtained, e) operations a, b, c and d are reiterated for said new signal and so on until the peaks are exhausted, f) on the basis of the different informations successively obtained for the different correlation peaks, the transmitted information is restored.

The present invention also relates to a direct sequence spread spectrum receiver for the successive processing of correlation peaks corresponding to different transmission paths, for the performance of the process defined hereinbefore. This receiver comprises at least two circuits in cascade, each having:

an adder able to receive an input signal, means for performing a correlation between a pseudorandom sequence and the input signal, said means supplying several correlation peaks, means for determining the highest amplitude peak and for restoring the corresponding information, means for respreading the information obtained corresponding to the highest amplitude peak and for obtaining an output signal of appropriate polarity, means for delaying the input signal by a time equal to the output signal formation time, said output signal and said delayed signal of one of the circuits constituting the input signal of the following circuit.

DETAILED DESCRIPTION OF EMBODIMENTS

Before describing certain embodiments of the invention, it is useful to make a few remarks on the nature of the signals processed in spread spectrum receivers.

Consideration is given to a pulsation carrier w, phase modulated by a function of the time P(t). The modulated signal can be written:

$$s(t)=A(t)\cos[wt+P(t)]$$

in which A(t) is the amplitude of the signal.

This expression can be developed to:

$$s(t)=A(t)\cos wt \cos P(t) - A(t) \sin wt \sin P(t)$$

By designating I(t) the part A(t)cosP(t), which is in phase with the carrier and Q(t) the part A(t)sinP(t), which is in quadrature with the carrier, the latter signal can also be written in the form:

$$s(t)=I(t)\cos wt - Q(t)\sin wt$$

It is then appropriate to consider the complex signal S(t):

$$S(t)=U(t)\exp(jwt)$$

with U(t)=I(t)+jQ(t). The true signal s(t) then corresponds to the real part of the complex signal S(t).

Thus, the signal s(t) can then be carried out by the double processing of the parts I(t) and Q(t), which will subsequently be designated I and Q for reasons of simplification.

The processors processing such signals generally receive on two separate inputs the signals I and Q. These signals are obtained by multiplying the reception signal by a wave which is either in phase with the carrier or in quadrature therewith. The processors then perform various processings as a function of the modulations used. Thus, in the case of a phase differential modulation, there are processing operations consisting of forming the sum or difference of delayed or undelayed sample products, such as e.g. $(I_k I_{k-1} + Q_k Q_{k-1})$ and $(Q_k I_{k-1} - I_k Q_{k-1})$ where k designates the rank or order of a sample.

Literature on this subject calls the first expression Dot and the second Cross. These terms result from the fact that the first signal is of the "internal product" or "scalar product" type between two quantities, conventionally designated by a Dot, whereas the second is of the "external product" or "vector product" type, conventionally designated by a cross.

Figure 1:
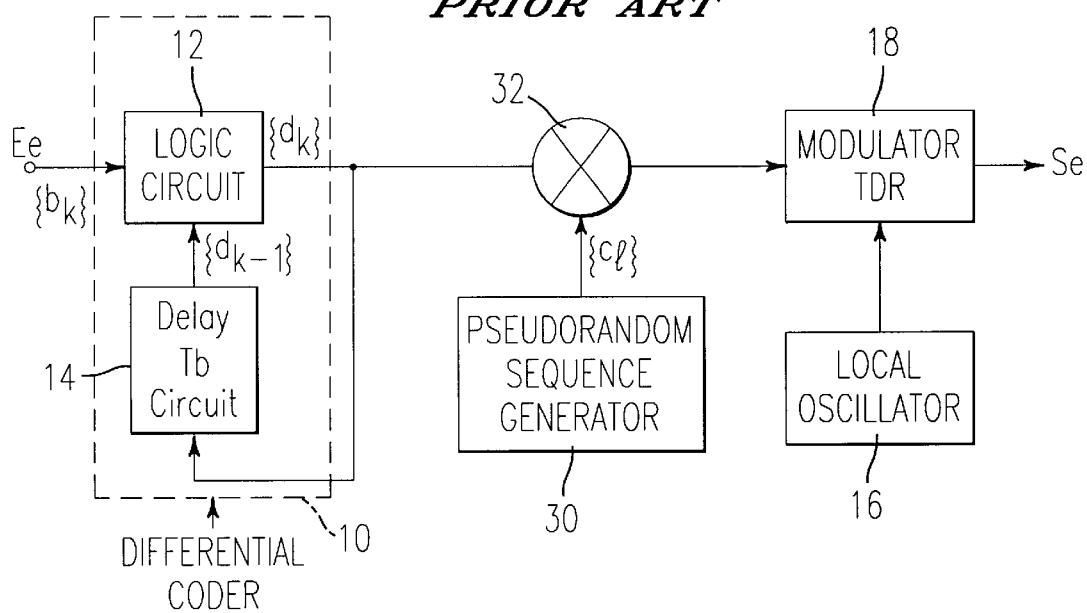
FIG. 1, already described, is a block diagram of a known, spread spectrum emitter.
Figure 2:
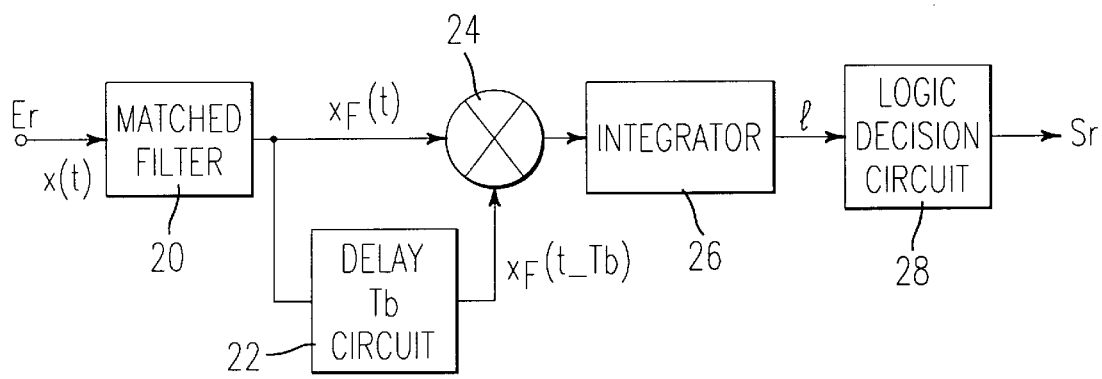
FIG. 2, already described, is a block diagram of a known, spread spectrum receiver.
Figure 3:
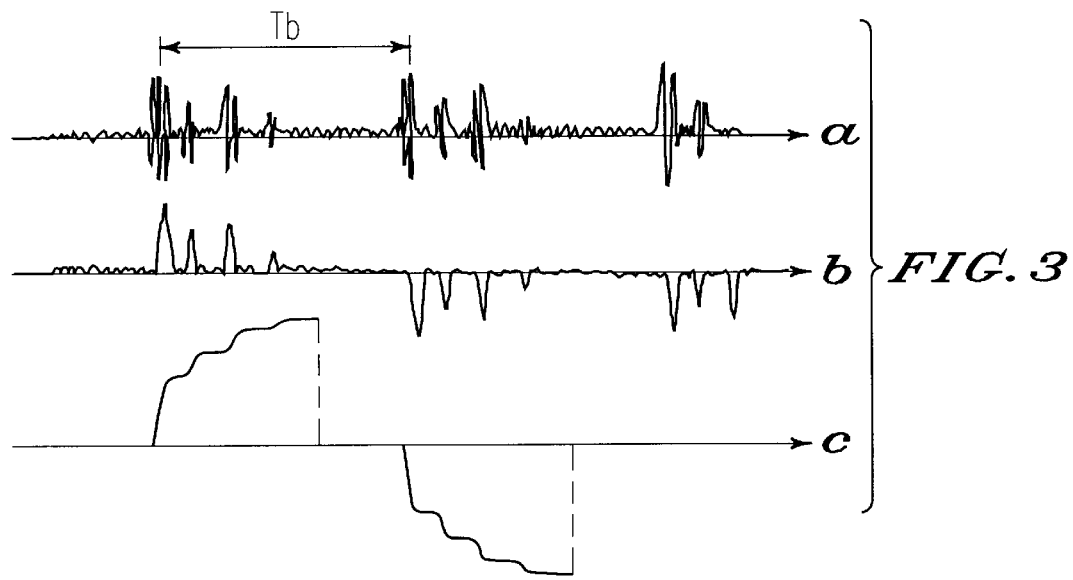
FIG. 3, already described, illustrates the general operation of a receive like that of FIG. 2.

It is possible to demonstrate that the product of a sample of rank k of signal s(t), i.e. s(k), by a conjugate previous sample, i.e. s*(k−1) and which is calculated in the receiver for demodulating the signal (cf. multiplier 24 in FIG. 2) is, to within the fixed phase rotation, of form:

$$Dot(k)+jCross(k).$$

The Dot signal permits the determination of the phase shift between two successive symbols, whereas the Dot and Cross signals considered together, make it possible to determine the integral number of times $\pi/2$ of the phase shift between successive symbols. Thus, said Dot and Cross signals permit the correct, ambiguity-free demodulation when a differential phase modulation has been used on emission.

Thus, a spread spectrum signal receiver firstly forms the in phase and in quadrature parts I and Q, followed by matched filtering on each of these signals. On the basis of the samples obtained, the receiver calculates the Dot and Cross signals and, on the basis thereof, restores the information carried by the signal received.

FR-A-2 742 014 describes a receiver implementing this technique. On FIG. 4 of the said document is shown a receiver comprising two similar channels, one processing the in phase part I and the other the in quadrature part Q. The first digital processing channel of the in phase part I with the carrier comprises:

i) first digital means 50(I) able to fulfill a first matched filtering function on the pseudorandom sequence used on emission, ii) first digital means 60(I) able to fulfill a first delay function.

The circuit also comprises a second digital processing channel receiving the second part Q of the signal received, said second part being in phase quadrature with the carrier. Like the first, said second channel comprises:

i) second digital means 50(Q) able to fulfill a second matched filtering function at said pseudorandom sequence, ii) second digital means 60(Q) able to fulfill a delay function.

The circuit described in said document also comprises a multiplication circuit 70 having:

two first inputs, one connected to the output of the first digital filtering means 50(I) and receiving a first filtered signal $I_k$ and the other connected to the output of the first means able to fulfill the delay function 60(I) and receiving a first delayed, filtered signal $I_{k-1}$, two second inputs, one connected to the output of the second digital filtering means 50(Q) and receiving a second filtered signal $Q_k$ and the other connected to the output of second means able to fulfill the delay function 60(Q) and receiving a second delayed, filtered signal $Q_{k-1}$, means for calculating the two direct products between filtered and delayed, filtered signals of the first and second channels, namely $I_k I_{k-1}$ and $Q_k Q_{k-1}$, and the two crossed products between the filtered signal of one channel and the delayed, filtered signal of the other channel, namely $Q_k I_{k-1}$ and $I_k Q_{k-1}$, means for calculating the sum of the direct products, i.e. $I_k I_{k-1} + Q_k Q_{k-1}$ and the difference of the crossed products, i.e. $Q_k I_{k-1} - I_k Q_{k-1}$.

The circuit described in said document also comprises a clock regeneration and integration circuit 80 receiving the sum of the direct products and the difference of the crossed products. This circuit also comprises a digital programming means 90 containing informations suitable for programming the first and second filtering means 50(I), 50(Q).

The two channels also have first and second shaping and summating circuits 95(I), 95(Q), respectively placed in front of the first and second filtering means 50(I), 50(Q).

Figure 4:
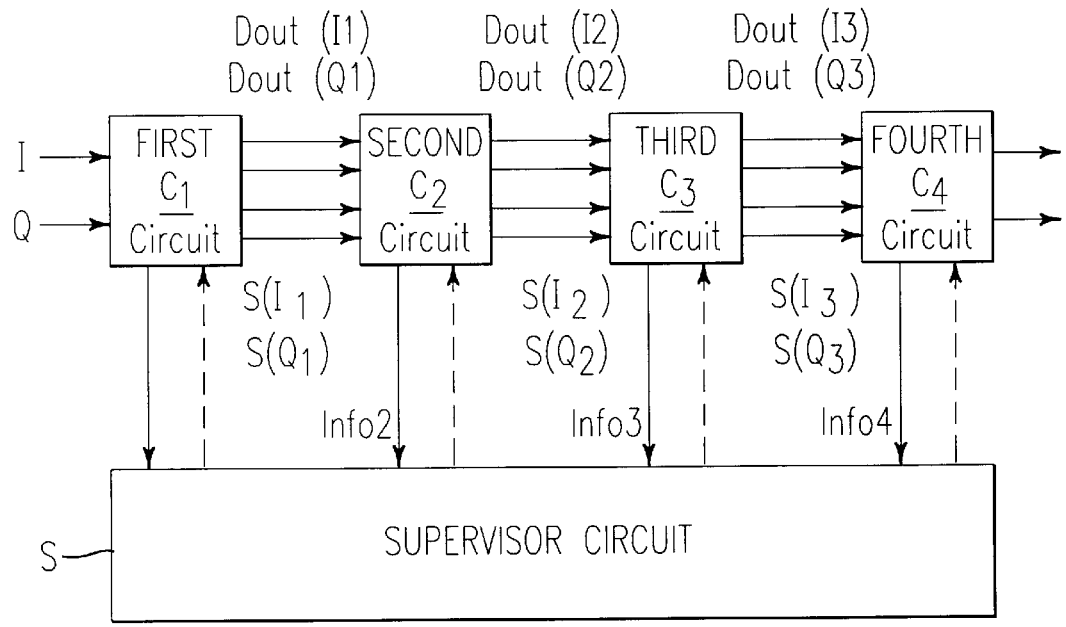
FIG. 4 shows the general diagram of a receiver according to the invention.

After describing the processing carried out in a receiver, a description can be given of the general diagram of a receiver according to the invention. As shown in FIG. 4, said receiver comprises a cascade, namely four circuits C1, C2, C3, C4 (the number 4 obviously being non-limitative) and a supervisor circuit S. The first circuit C1 receives the base band data, i.e. the in phase part I and the in phase quadrature part Q. The first circuit C1 supplies the base band data S(I1) and S(Q1), which correspond to the highest amplitude peak and the initial data Dout($I_1$) and Dout($Q_1$) delayed by the time necessary for the formation of S(I1) and S(Q1). The following circuit C2 receives these two types of signals, subtracts from Dout(I1) the part S(I1) and from Dout(Q1) the part S(Q1) and performs, on the resultant signals, the same processing as the circuit C1. The circuit C2 then supplies the base band data S(I2) and S(Q2) and the delayed data Dout(I2), Dout(Q2), which are supplied to the circuit C3 and so on.

The input signal, with its plurality of components corresponding to the plurality of paths taken by the radio wave between the emitter and receiver is thus progressively freed from these components, which are extracted at each stage.

From each circuit C1, C2, C3, C4, the supervisor S receives the corresponding informations Info1, Info2, Info3, Info4 and synchronizes the overall operations.

Figure 5:
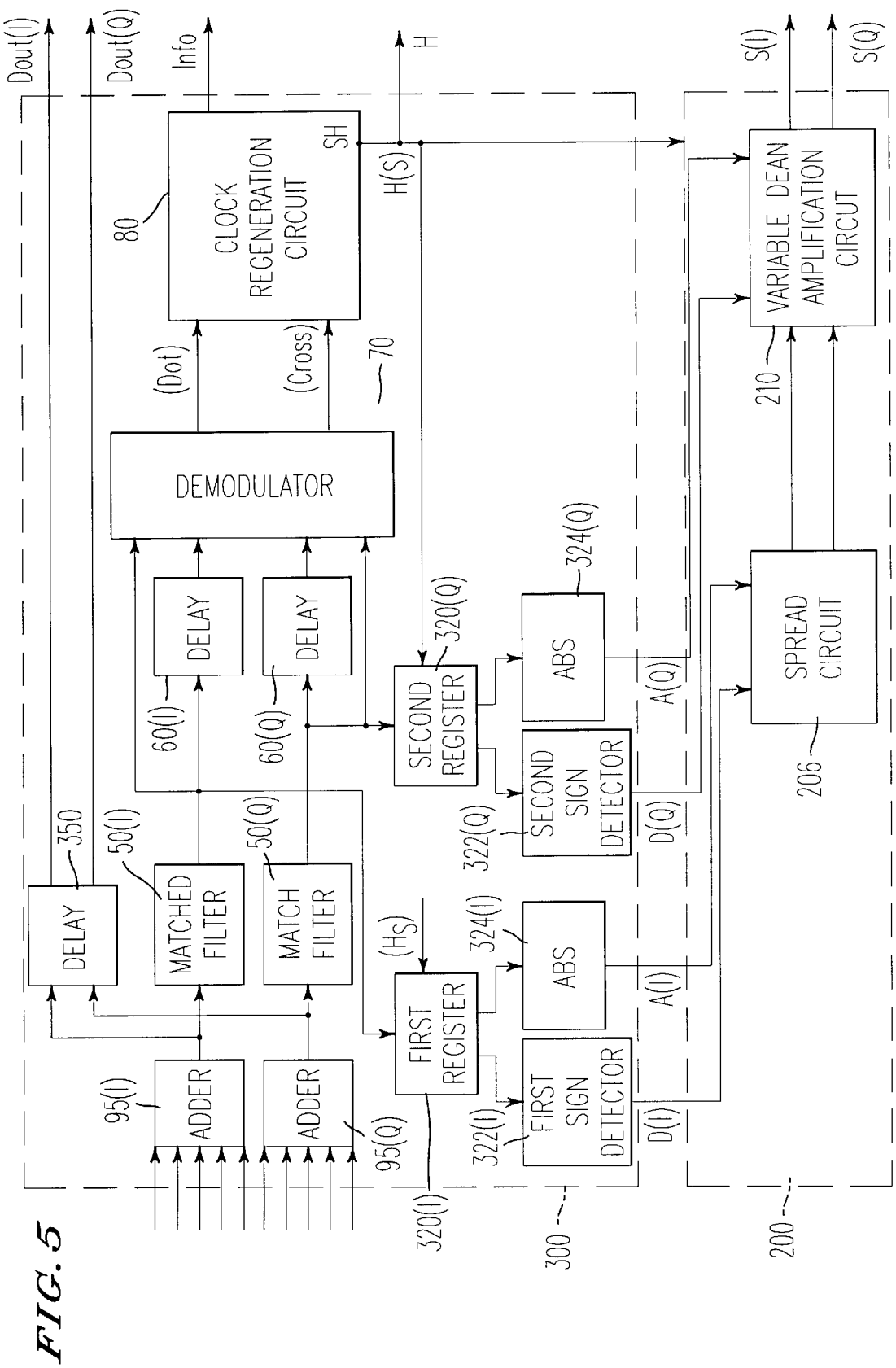
FIG. 5 illustrates an embodiment of one of the circuits forming the receiver according to the invention.

FIG. 5 illustrates an embodiment of any random one of the circuits C1, C2, C3, C4. This circuit C comprises known means referred to hereinbefore and which for this reason carry the same references, namely two adders 95(I), 95(Q), two filters matched to the pseudorandom sequence of the user 50(I), 50(Q), two symbol Ts period delay means 60(I), 60(Q), a demodulator 70 receiving the filtered signals $I_k$ and $Q_k$ and the delayed, filtered signals $I_{k-1}$ and $Q_{k-1}$ and supplying the above-defined, Dot and Cross signals.

The circuit also comprises a block 80 which, based on the Dot and Cross signals, supplies a clock symbol Hs and the information concerning the value of the symbol.

The circuit also comprises:

a first register 320(I) connected to the output of the first matched filtering means 50(I) of the first channel I and controlled by the clock symbol signal Hs supplied by a clock regeneration circuit (80), said first register having an output, a second register 320(Q) connected to the output of the first matched filtering means 50(Q) of the second channel and controlled by the clock symbol signal Hs supplied by the clock regeneration circuit 80, said second register having an output, a first sign detector 322(I) connected to the output of the first register 320(I) and supplying a first data item D(I) individual to the first channel, a second sign detector 322(Q) connected to the output of the second register 320(Q) and supplying a second data item D(Q) individual to the second channel, a first circuit 324(I) for the determination of the absolute value A(I) of the signal supplied by the output of the first register 320(I), a second circuit 324(Q) for the determination of the absolute value A(Q) of the signal supplied by the output of the second register 320(Q)

a circuit 200 incorporating a spread circuit 206 controlled by the signals D(I) and D(Q) and a variable gain amplification circuit 210 receiving the control signals A(I) and A(Q) and which supplies S(I) and S(Q), a delay means 350, which can be a FIFO (First-In-First-Out) memory, which receives the input signals I and Q and delays them by a time equal to that taken by the circuit for constituting the data S(I), S(Q).

Finally, the circuit C supplies first signals Dout(I), Dout(Q) constituting the delayed input signal and second signals S(I), S(Q) constituting the parts to be subtracted from the former. This subtraction takes place automatically in input adders of the following circuit, if there is an appropriate polarity on the part of the signals S(I), S(Q).

Figure 6:
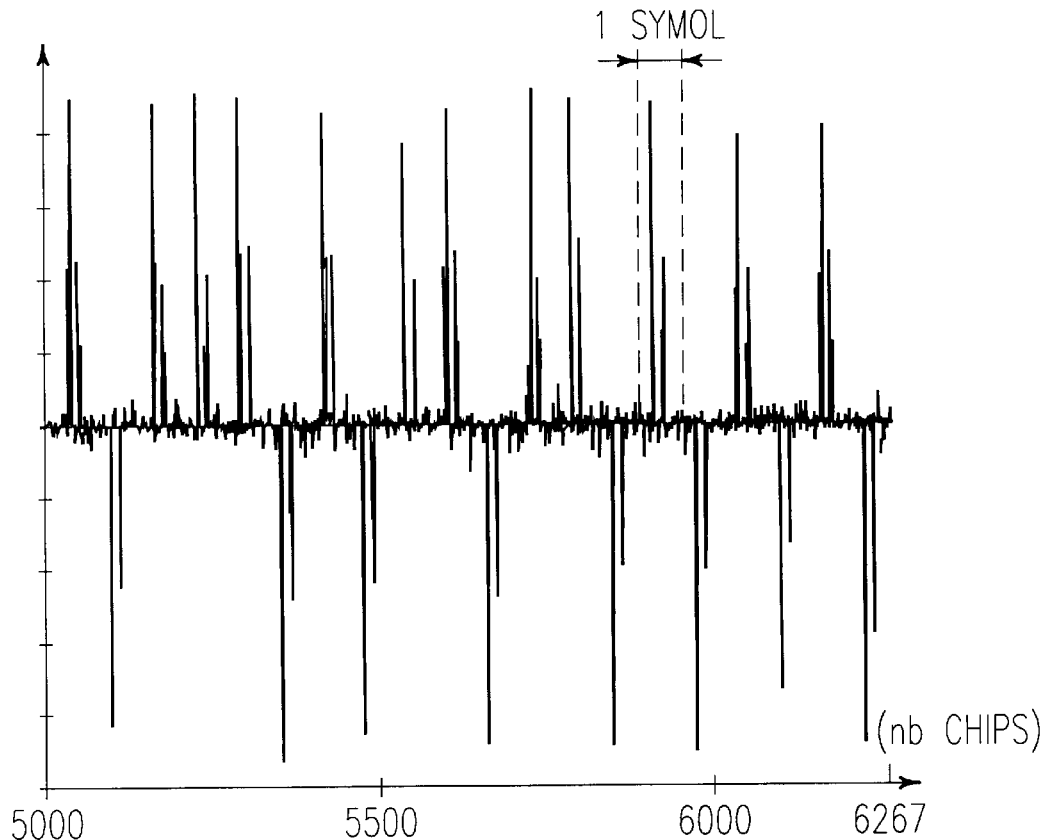
FIG. 6 shows the characteristic of a Dot signal in the first stage of a receiver.
Figure 7:
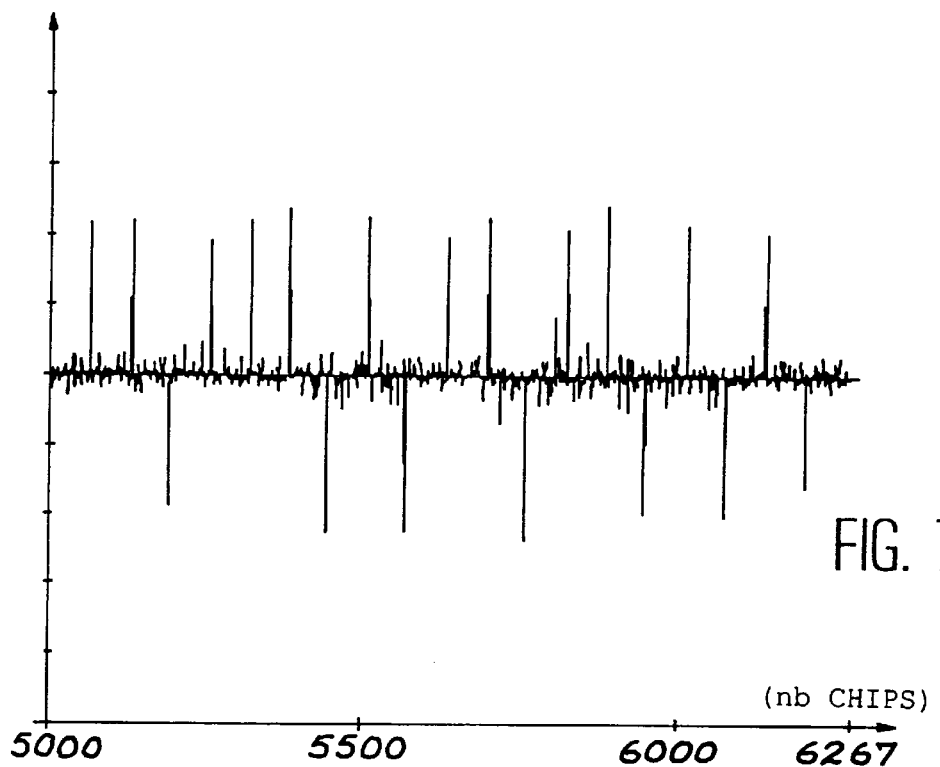
FIG. 7 shows the characteristic of the Dot signal in the second stage of the receiver, following the elimination of the highest amplitude peak.
Figure 8:
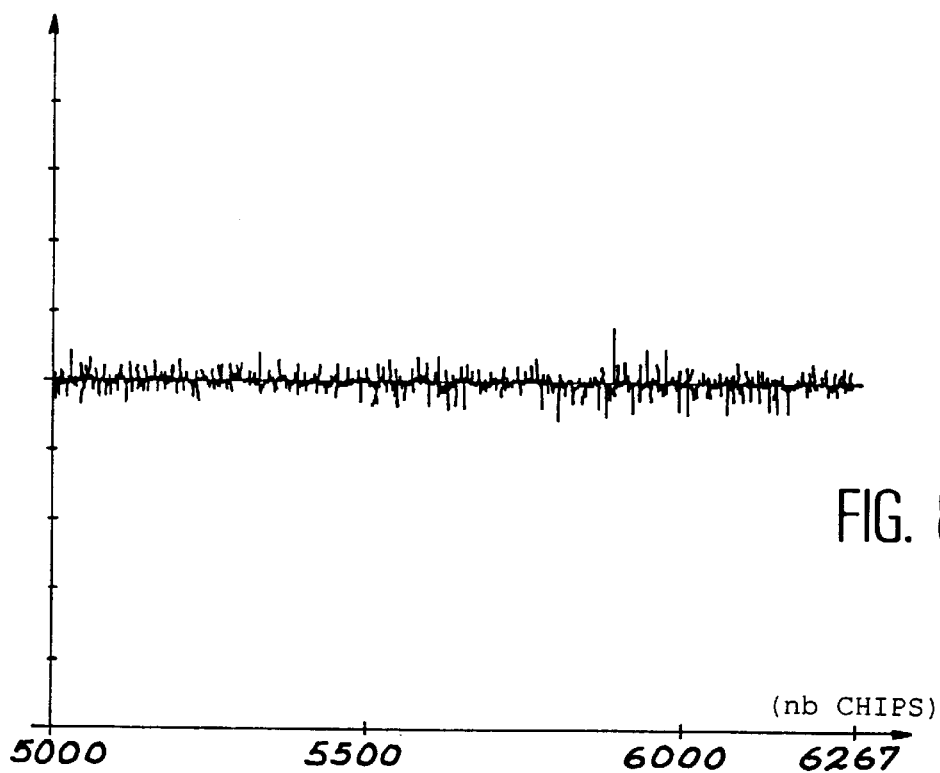
FIG. 8 shows the characteristic of the Dot signal in the third stage, after eliminating the two highest amplitude peaks.

FIGS. 6 to 8 illustrate the results obtained with a three-stage receiver.

FIG. 6 shows the characteristic of the Dot signal in the first stage (i.e. at the output of the circuit 70). It can be seen that in each symbol period, there is a peak (positive or negative as a function of the binary data value) of high amplitude, followed by lower amplitude peaks.

FIG. 7 shows the Dot signal extracted from the second stage. It can be seen that the first peak has disappeared and that only the second remains, together with noise.

FIG. 8 shows the Dot signal in the third stage, where the correlation peaks have disappeared and only noise remains. Thus, in this case it is a two-path channel.

What is claimed is:

1. Process for the processing of a signal corresponding to a direct sequence spread spectrum information transmission through a multiple path channel, said process being characterized in that it comprises the following operations:

a) a correlation is performed between the signal to be processed and the direct sequence used, which supplies several correlation peaks of different amplitudes, b) the highest amplitude correlation peak is determined and the corresponding information restored, c) the spectrum of the information corresponding to the highest amplitude peak is respread using the same direct sequence, d) from the signal to be processed is subtracted the part corresponding to said respread information and a new signal is obtained, e) operations a, b, c and d are reiterated for said new signal and so on until the peaks are exhausted, f) on the basis of the different informations successively obtained for the different correlation peaks, the transmitted information is restored.

2. A direct sequence spread spectrum differential receiver, comprising:

a first circuit; and at least one other circuit, the first circuit and the at least one other circuit being configured in cascade with one another, each of the first circuit and the at least one other circuit having:

an adder configured to receive two input signals, a correlation mechanism configured to perform a correlation between a pseudorandom sequence and the two input signals, the correlation mechanism supplying several correlation peaks, a peak amplitude determination mechanism configured to determine a highest amplitude peak and to restore information corresponding to the highest amplitude peak, a respreading mechanism configured to respread the restored information to generate an output signal, and a delay configured to delay the two input signals by a time equal to that for forming the output signal to generate two delayed input signals, wherein the output signal and the two delayed input signals of the first circuit are provided as inputs to a subsequent one of the at least one other circuit, the subsequent one of the at least one other circuit following the first circuit in cascade.

3. The receiver of claim 2, wherein:

the output signal and the two delayed input signals of the subsequent one of the at least one other circuit are provided as inputs to another subsequent one of the at least one other circuit, the another subsequent one of the at least one other circuit following the subsequent one of the at least one other circuit in cascade.

4. A direct sequence spread spectrum differential receiver, comprising:

at least two circuits configured in cascade with one another, each of the at least two circuits having a first channel configured to process a first part of an input signal in phase with a carrier received, the first channel including a first adder, a first matched filter configured to correspond to a particular pseudorandom sequence and to produce a first filtered signal ($I_k$), and a first delay configured to produce a delayed first filtered signal ($I_{k-1}$), a second channel configured to process a second part of the input signal in phase quadrature with the carrier received, the second channel including a second adder, a second matched filter configured to correspond to the particular pseudorandom sequence and to produce a second filtered signal ($Q_k$), and a second delay configured to produce a delayed second filtered signal ($Q_{k-1}$), and a demodulation circuit configured to receive the first filtered signal, the delayed first filtered signal, the second filtered signal, and the delayed second filtered signal and to calculate a Dot signal equal to ($I_k I_{k-1} + Q_k Q_{k-1}$) and a Cross signal equal to ($Q_k I_{k-1} - I_k Q_{k-1}$).

5. The receiver of claim 4, further comprising:

a clock regeneration circuit configured to generate a clock symbol signal;

a first register connected to an output of the first matched filter, having a first register output, and controlled by the clock symbol signal;

a second register connected to an output of the second matched filter, having a second register output, and being controlled by the clock symbol signal;

a first sign detector connected to the first register output, having a first sign detector output, and configured to supply a first data item to the first channel;

a second sign detector connected to the second register output, having a second sign detector output, and configured to supply a second data item to the second channel;

a first circuit configured to output a first absolute value signal being an absolute value of a first register signal output at the first register output;

a second circuit configured to output a second absolute value signal being an absolute value of a second register signal output at the second register output, a pseudorandom sequence spread spectrum circuit connected to the first sign detector output and the second sign detector output and configured to generate two spread circuit output signals; and an amplification and inversion circuit configured to amplify and invert the two spread circuit output signals to produce two amplified and inverted output signals and having two gain control inputs respectively connected to the first absolute value signal and the second absolute value signal.

6. A direct sequence spread spectrum differential receiver, comprising:

a first circuit; and at least one other circuit, the first circuit and the at least one other circuit being configured in cascade with one another, each of the first circuit and the at least one other circuit having:

adder configured to receive two input signals, a correlation means for performing a correlation between a pseudorandom sequence and the two input signals, the correlation means supplying several correlation peaks, a peak amplitude determination means for determining a highest amplitude peak and for restoring information corresponding to the highest amplitude peak, a respreading means for respreading the restored information to generate an output signal, and a delay means for delaying the two input signals by a time equal to that for forming the output signal to generate two delayed input signals, wherein the output signal and the two delayed input signals of the first circuit are provided as inputs to a subsequent one of the at least one other circuit, the subsequent one of the at least one other circuit following the first circuit in cascade.

* * * * *